United States Patent
Hayashi

(10) Patent No.: US 7,860,413 B2
(45) Date of Patent: Dec. 28, 2010

(54) IMAGE FORMING APPARATUS AND METHOD THEREFOR AS WELL AS PROGRAM AND STORAGE MEDIUM THEREOF

(75) Inventor: Toshio Hayashi, Toride (JP)

(73) Assignee: Canon Kabushiki Kaisha (JP)

( * ) Notice: Subject to any disclaimer, the term of this patent is extended or adjusted under 35 U.S.C. 154(b) by 661 days.

(21) Appl. No.: 11/692,168

(22) Filed: Mar. 27, 2007

(65) Prior Publication Data

US 2007/0285636 A1 Dec. 13, 2007

(30) Foreign Application Priority Data

Apr. 12, 2006 (JP) .............................. 2006-110001

(51) Int. Cl.
*G03G 15/01* (2006.01)

(52) U.S. Cl. .............................. 399/28; 399/29; 399/49; 347/131

(58) Field of Classification Search .................. 399/28, 399/29, 39, 61

See application file for complete search history.

(56) References Cited

U.S. PATENT DOCUMENTS 5,493,321 A * 2/1996 Zwadlo ...................... 347/131
6,175,100 B1 * 1/2001 Creamer et al. .............. 219/401
2004/0141765 A1 * 7/2004 Shimura et al. ................ 399/49

FOREIGN PATENT DOCUMENTS

JP 2004-142250 A 5/2004
JP 2004-347666 A 12/2004

* cited by examiner

*Primary Examiner*—David M Gray
*Assistant Examiner*—Roy Yi
(74) *Attorney, Agent, or Firm*—Rossi, Kimms & McDowell LLP

(57) ABSTRACT

An image forming apparatus which is capable of adjusting the color density while improving the printing efficiency. A color density adjustment value-adjusting unit adjusts a color density adjustment value in predetermined adjustment timing so as to keep colors of an image constant. A color density adjustment value-storing unit stores the color density adjustment value in advance. An adjustment timing occurrence-determining unit determines whether or not the adjustment timing occurs during execution of an image forming job. A color density adjustment value-predicting unit predicts the color density adjustment value in the adjustment timing determined to occur, based on the color density adjustment value stored in advance. The color density adjustment value-adjusting unit is adapted to adjust the color density adjustment value based on the predicted color density adjustment value.

15 Claims, 6 Drawing Sheets

FIG. 4

| Addr | Field | Color |
|---|---|---|
| 00h | LASER POWER (n) | Y |
| 01h | | M |
| 02h | | C |
| 03h | | K |
| 04h | LASER POWER (n-1) | Y |
| 05h | | M |
| 06h | | C |
| 07h | | K |
| 08h | LASER POWER (n-2) | Y |
| 09h | | M |
| 0Ah | | C |
| 0Bh | | K |
| 0Ch | PRIMARY ELECTROSTATIC CHARGER VOLTAGE (n) | Y |
| 0Dh | | M |
| 0Eh | | C |
| 0Fh | | K |
| 20h | PRIMARY TRANSFERRING ELECTROSTATIC CHARGER VOLTAGE (n-2) | Y |
| 21h | | M |
| 22h | | C |
| 23h | | K |
| 24h | TONER SUPPLY AMOUNT (n) | Y |
| 25h | | M |
| 26h | | C |
| 27h | | K |
| 2Ch | TONER SUPPLY AMOUNT (n-2) | Y |
| 2Dh | | M |
| 2Eh | | C |
| 2Fh | | K |

FIG. 7

ADJUSTMENT OF PREDICTED
VALUE PERFORMED?

YES    NO

IMAGE FORMING APPARATUS AND METHOD THEREFOR AS WELL AS PROGRAM AND STORAGE MEDIUM THEREOF

BACKGROUND OF THE INVENTION

1. Field of the Invention

The present invention relates to an image forming apparatus and a method therefor as well as a program and a storage medium thereof, and specifically relates to an image forming apparatus and a method therefore, a program and a storage medium having a color density adjusting section for adjusting color density of an image.

2. Description of the Related Art

As for conventional copying machines, and color copying machines in particular, there are models which adjust various kinds of color density parameters so as to make colors fixed in predetermined timing in the case of making multiple copies of multiple originals.

The predetermined timing is often set at every time when copying of a predetermined number of sheets of pare (e.g. 2,000 sheets of A4 paper) has finished, or every time when a predetermined period of time (e.g. one hour) has passed, for example.

In the case of the color copying machines for instance, the various kinds of color density parameters include a high bias voltage applied to a photosensitive member (a photosensitive drum or a photosensitive belt), an amount of emission of a laser element for forming a latent image on the photosensitive member and an amount of toner supplied to the photosensitive member.

The color density parameters change in value due to environmental changes (temperature, humidity, and the like) for each of members during execution of a print job in the short run and due to characteristic fluctuation of each of the members derived from aged deterioration (a charging characteristic of the photosensitive member, the amount of emission of the laser element, and the like) in the long run. Therefore, unless the color density parameters are adequately adjusted, the colors primarily change during the execution of a print job.

In the case of an electrophotographic color image, the changes in the colors mean changes in density reproducibility of each color of yellow (Y) toner, magenta (M) toner, cyan (C) toner and black (K) toner for expressing full color.

For instance, if the amount of toner supplied to the photosensitive member increases, the color density becomes accordingly denser. If a charging voltage applied to the photosensitive member increases, the amount of toner electrostatically adhering to the photosensitive member increases and the color density becomes accordingly denser. Furthermore, if power of a laser beam radiated on the photosensitive member increases, the latent image formed on the photosensitive member becomes denser, thereby increasing the amount of toner adhered to make the color density denser accordingly.

The Y toner, the M toner, the C toner, and the M toner are different in characteristic from each other. For instance, in a case where the power of the laser beam is increased by 10%, the densities of the Y toner, the M toner, the C toner, and the K toner increase by 5%, 12%, 10% and 2%, respectively. Thus, a degree of the color density increasing varies generally according to the color. Further, it is widely known that, for example, the M toner includes several tens of percent of a Y component, and hence increase of the color density of M requires not only increase of the amount of the M toner, but also adjustment of the amount of the Y toner, otherwise the color cannot be changed as desired.

Thus, it is known that the adjustment of the color density requires fine adjustment of respective colors of Y, M, C and K, and further, it generally takes several minutes to adjust the respective color densities.

However, in a case where this adjustment is normally performed, that is, if the adjustment timing is set at every 2,000 sheets for instance, the adjustment of the color density is to be started during the execution of the copy job on appearance of a user who makes 10 copies for each of 50 originals after printing of 1,800 sheets has been finished following the adjustment. Consequently, there occurs a problem that a next user waiting for completion of printing in front of an image forming apparatus is kept waiting during that time.

There are also many users who do not care much about stability of the colors as long as red is reddish and blue is bluish in expression. Even for such users, the color density adjusting process during the execution of the copy job induces unpleasantness.

As for this problem, there is proposed a technology of starting the copy job after adjusting the color density according to predicted values when starting the next copy job based on elapsed time from completion of the copy job or the elapsed time and the environmental conditions (refer to Japanese Laid-Open Patent Publication (Kokai) No. 2004-347666, for instance).

Furthermore, there is proposed a technique of measuring the number of copies is measured, adjusting the color density if it is predicted, when the copy job is finished, that a color density adjusting mode will be started during the execution of the next job, and then clearing the measured number of copies (refer to Japanese Laid-Open Patent Publication (Kokai) No. 2004-142250, for instance).

However, in the technique typified by Japanese Laid-Open Patent Publication (Kokai) No. 2004-347666, the timing of adjusting the color density according to the predicted values is based on the elapsed time from completion of the previous job. To this end, in a case where a printout of the previous job is comprised of a text-based job of a low printing duty, a degree of fatigue of the photosensitive member and the laser element is low so that the timing of adjusting the color density may be retarded. In a case where the job to be started takes a long time, there may occur the timing of adjusting the color density once more during the execution of the job. In that case, it is necessary to cancel the color density adjustment or interrupt the job once and start a normal color density adjustment.

In the technique typified by Japanese Laid-Open Patent Publication (Kokai) No. 2004-142250, the timing of adjusting the color density is based on the number of copies from completion of the previous job. To this end, in a case where the printout of the job last time is a job of a low print duty such as a text-based job, the degree of fatigue of the photosensitive member and the laser element is low so that the timing of adjusting the color density may be retarded. In a case where the job is started immediately after the previous job, the user eventually needs to wait for the time required for the color density adjustment.

As described above, there are also many users who do not care much about stability of the colors as long as red is reddish and blue is bluish in expression. There are also the cases where such users do not need the frequent adjusting process itself.

SUMMARY OF THE INVENTION

It is an object of the present invention to provide an image forming apparatus and a method therefor as well as a program and a storage medium thereof which is capable of adjusting the color density while improving the printing efficiency.

To attain the above-mentioned object, according to a first aspect of the present invention, there is provided an image forming apparatus: comprising a color density adjustment value-adjusting unit adapted to adjust a color density adjustment value in predetermined adjustment timing so as to keep colors of an image constant; a color density adjustment value-storing unit adapted to store the color density adjustment value in advance; an adjustment timing occurrence-determining unit adapted to determine whether or not the adjustment timing occurs during execution of an image forming job; and a color density adjustment value-predicting unit adapted to predict the color density adjustment value in the adjustment timing determined to occur, based on the color density adjustment value stored in advance, wherein the color density adjustment value-adjusting unit is adapted to adjust the color density adjustment value based on the predicted color density adjustment value.

The color density adjustment value can be comprised of a plurality of color density adjustment values including at least the color density adjustment value of previous image formation.

The color density adjustment value-predicting unit can predict the color density adjustment value with an extrapolation method.

The image forming apparatus further can comprise a selection unit is adapted to cause a user to select whether or not adjustment of the color density adjustment value is executed based on the predicted color density adjustment value.

The image forming apparatus further can comprise an image forming job finish-determining unit adapted to determine whether or not the image forming job has been finished; and a color density adjustment execution-determining unit adapted to determine whether or not adjustment of the color density adjustment value is executed based on the predicted color density adjustment value when the image forming job has been finished, wherein the color density adjustment value-adjusting unit is adapted to adjust the color density adjustment value based on a predetermined normal color density adjustment value in a case where the adjustment of the color density adjustment value is executed based on the predicted color density adjustment value.

The image forming apparatus further can comprise an image forming job occurrence-determining unit adapted to determine whether or not an image forming job occurs during adjustment of the color density adjustment value based on the predetermined normal color density adjustment value, a normal adjustment-interrupting unit adapted to interrupt the adjustment of the color density adjustment value based on the predetermined normal color density adjustment value when the image forming job occurs during the adjustment of the color density adjustment value based on the predetermined normal color density adjustment value; and a color density adjustment value-updating unit adapted to, when the adjustment of the color density adjustment value based on the predetermined normal color density adjustment value has been finished with no image forming job occurring, update the color density adjustment value stored in the color density adjustment value-storing unit to the color density adjustment value acquired when the adjustment of the color density adjustment value has been finished.

To attain the above-mentioned object, according to a second aspect of the present invention, there is provided an image forming method comprising: a color density adjustment value-adjusting step of adjusting a color density adjustment value in predetermined adjustment timing so as to keep colors of an image constant; a color density adjustment value-storing step of storing the color density adjustment value in advance; an adjustment timing occurrence-determining step of determining whether or not the adjustment timing occurs during execution of an image forming job; and a color density adjustment value-predicting step of predicting the color density adjustment value in the adjustment timing determined to occur, based on the color density adjustment value stored in advance, wherein the color density adjustment value-adjusting step comprises adjusting the color density adjustment value based on the predicted color density adjustment value.

The color density adjustment value can be comprised of a plurality of color density adjustment values including at least the color density adjustment value of previous image formation.

The color density adjustment value-predicting step can comprise predicting the color density adjustment value with an extrapolation method.

The image forming method further can comprise a selection step of causing a user to select whether or not adjustment of the color density adjustment value is executed based on the predicted color density adjustment value.

The image forming method further can comprise an image forming job finish-determining step of determining whether or not the image forming job has been finished; and a color density adjustment execution-determining step of determining whether or not adjustment of the color density adjustment value is executed based on the predicted color density adjustment value when the image forming job has been finished, wherein the color density adjustment value-adjusting step comprises adjusting the color density adjustment value based on a predetermined normal color density adjustment value in a case where the adjustment of the color density adjustment value is executed based on the predicted color density adjustment value.

The image forming method further can comprise an image forming job occurrence-determining step of determining whether or not an image forming job occurs during adjustment of the color density adjustment value based on the predetermined normal color density adjustment value, a normal adjustment-interrupting step of interrupting the adjustment of the color density adjustment value based on the predetermined normal color density adjustment value when the image forming job occurs during the adjustment of the color density adjustment value based on the predetermined normal color density adjustment value; and a color density adjustment value-updating step of, when the adjustment of the color density adjustment value based on the predetermined normal color density adjustment value has been finished with no image forming job occurring, updating the image density adjustment value stored in the color density adjustment value-storing unit to the color density adjustment value acquired when the adjustment of the color density adjustment value has been finished.

To attain the above-mentioned object, according to a third aspect of the present invention, there is provided a program for causing a computer to execute an image forming method comprising: a color density adjustment value-adjusting module of adjusting a color density adjustment value in predetermined adjustment timing so as to keep colors of an image constant; a color density adjustment value-storing module of storing the color density adjustment value in advance; an adjustment timing occurrence-determining module of determining whether or not the adjustment timing occurs during execution of an image forming job; and a color density adjustment value-predicting module of predicting the color density adjustment value in the adjustment timing determined to occur, based on the color density adjustment value stored in advance, wherein the color density adjustment value-adjusting module comprises adjusting the color density adjustment value based on the predicted color density adjustment value.

To attain the above-mentioned object, according to a fourth aspect of the present invention, there is provided a computer-readable storage medium for storing the program according to the third aspect of the present invention.

According to the present invention, based on a color density adjustment value stored in advance, a color density adjustment value in adjustment timing which occurs during an image forming job is predicted and the color density adjustment value is adjusted based on the predicted color density adjustment value. Therefore, it is possible to perform the color density adjustment while improving the printing efficiency.

The above and other objects, features, and advantages of the invention will become more apparent from the following detailed description taken in conjunction with the accompanying drawings.

BRIEF DESCRIPTION OF THE DRAWINGS

FIG. 4 is a view showing an address map of an EEPROM in FIG. 2;

FIG. 7 is a view showing a display example of an operation panel disposed in the image forming apparatus of FIG. 1.

DETAILED DESCRIPTION OF THE PREFERRED EMBODIMENTS

The present invention will now be described in detail below with reference to the accompanying drawings showing preferred embodiment thereof.

Figure 1:
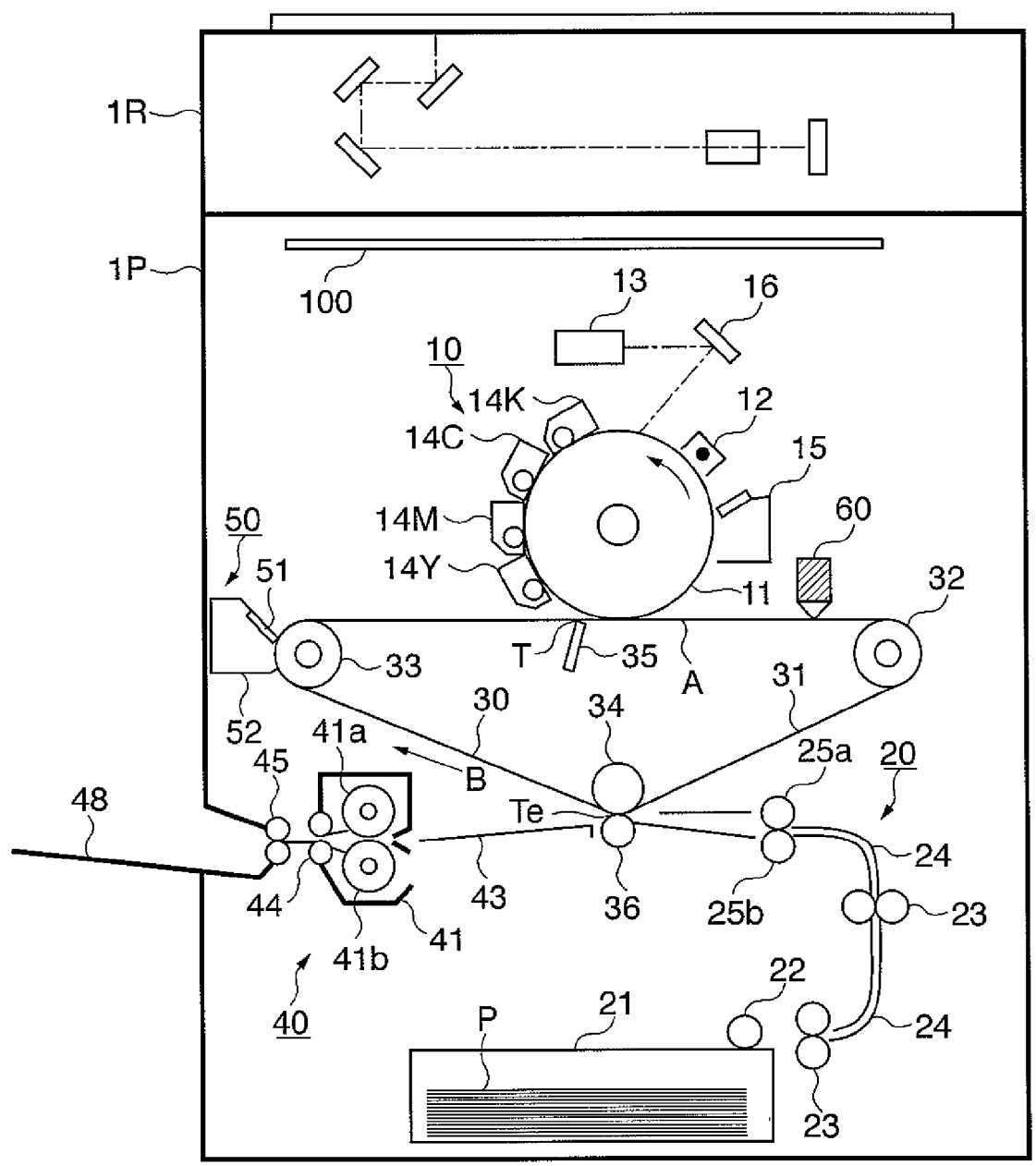
FIG. 1 is a view schematically showing a construction of an image forming apparatus according to an embodiment of the present invention.

FIG. 1 is a view schematically showing a construction of an image forming apparatus according to an embodiment of the present invention.

In FIG. 1, the image forming apparatus is comprised of an image scanner 1R and an image output apparatus 1P, constructions of which will be described hereinbelow in conjunction with their operations as required.

The image output apparatus 1P is mainly comprised of an image forming unit 10, a sheet feed unit 20, an intermediate transfer unit 30, a fixing unit 40, and a DC controller 100.

Each of the units will be further described in detail. The image forming unit 10 is constructed as below. A photosensitive member (photosensitive drum) 11 as an image carrier is pivotably supported at its center, and is rotatively driven in an arrow direction (counterclockwise). The photosensitive member 11 has a primary electrostatic charger 12, an exposure section 13 composed of a laser element, a return mirror 16, and development apparatuses 14Y, 14M, 14C and 14K disposed so as to be opposed to a peripheral surface of the photosensitive member 11 in the order of its rotation direction. The development apparatuses 14Y, 14M, 14C and 14K appropriately supply toner of yellow, magenta, cyan and black to the photosensitive member 11 in order, and sequentially perform development four times in total so as to form a full-color image.

First, yellow is developed. The primary electrostatic charger 12 provides charges of an even charging amount according to a yellow image on the surface of the photosensitive member 11. Next, the exposure unit 13 irradiates a light beam such as a laser beam modulated according to the yellow image, onto the photosensitive member 11 via the return mirror 16. This exposure forms a static latent image of the yellow image on the surface of the photosensitive member 11.

Furthermore, the static latent image is rendered as an actual image by the development apparatus 14Y in which a yellow developer (toner) is stored. A visible image (developed image) rendered as an actual image is transferred to a primary transfer area T of an intermediate transfer belt 31 which is an intermediate transfer element.

The rotation of the photosensitive member 11 causes a cleaning apparatus 15 to scrape off the yellow toner left on the photosensitive member 11 without being transferred to the intermediate transfer belt 31, at a location downstream of the primary transfer area T, to thereby clean the surface of the photosensitive member 11. As is the case with the above-mentioned process, the development apparatus 14M forms an image of the magenta toner, the development apparatus 14C forms an image of the cyan toner, and the development apparatus 14K forms an image of the black toner in sequence, respectively.

The sheet feed unit 20 includes a cassette 21 for housing transfer materials P, a pickup roller 22 for feeding the transfer materials P one by one from the cassette 21, a sheet feed roller 23, and a sheet feed guide 24. The sheet feed unit 20 also includes registration rollers 25a, 25b for feeding the transfer materials P to a secondary transfer area Te in image formation timing of the image forming portion 10.

The intermediate transfer unit 30 will be described in detail. The intermediate transfer belt 31 is wound around a driving roller 32 for driving the intermediate transfer belt 31, and a driven roller 33 and a secondary transfer opposed roller 34 which are driven by rotational movement of the intermediate transfer belt 31. The secondary transfer opposed roller 34 is opposed to the secondary transfer area Te through the intermediate transfer belt 31.

A primary transfer plane A is formed between the driving roller 32 and the driven roller 33. The driving roller 32 comprises a metal roller on a surface of which several-mm thick rubber (urethane or chloroprene) is coated, to thereby prevent the intermediate transfer belt 31 from slipping therewith. The driving roller 32 is rotatively driven in a direction of an arrow B by a pulse motor (not shown).

The primary transfer plane A is opposed to the image forming unit 10 so that the photosensitive member 11 is opposed to the primary transfer plane A of the intermediate transfer belt 31, thereby causing the primary transfer area T to be located on the primary transfer plane A. A primary transfer electrostatic charger 35 is disposed behind the intermediate transfer belt 31 at the primary transfer area T where the photosensitive member 11 is opposed to the intermediate transfer belt 31.

A secondary transfer roller 36 is disposed oppositely to the secondary transfer opposed roller 34 so as to form a nip portion in association with the intermediate transfer belt 31, thereby realizing the secondary transfer area Te. The secondary transfer roller 36 is pressed against the intermediate transfer belt 31 with an adequate pressure. A cleaning unit 50 for cleaning an image forming surface of the intermediate transfer belt 31 is disposed at a location downstream of the secondary transfer area Te on the intermediate transfer belt 31. The cleaning unit 50 includes a cleaning blade 51 and a waste toner box 52 for containing waste toner.

The fixing unit 40 includes a pair of fixing rollers 41 comprised of a fixing roller 41a having therein a heat source such as a halogen heater, and a pressing roller 41b (the pressing roller 41b may also have a heat source therein) pressed by the fixing roller 41a. The fixing unit 40 also includes a conveyance guide 43 for guiding the transfer materials P to a nip portion of a pair of the fixing rollers 41, and internal ejection rollers 44 and external ejection rollers 45 for further discharging the transfer material P discharged from a pair of the fixing rollers 41 to an outside of the apparatus.

A discharging tray 48 is disposed at a location downstream of the external ejection roller 45 so as to protrude toward the outside of the apparatus. A registration sensor 60 for detecting a registration deviation is disposed at a location downstream of the primary transfer area T on the primary transfer plane A.

Next, an operation of the image forming apparatus of FIG. 1 will now be described.

In FIG. 1, when the DC controller 100 sends an image forming operation start signal, pickup roller 22 firstly feeds the transfer materials P one by one from the cassette 21. Then, a pair of the sheet feed rollers 23 guide the transfer materials P toward the registration rollers 25a, 25b through the sheet feed guide 24 comprised of a pair of plates. At that time, the registration rollers 25a, 25b are stopped to thereby stop a tip of the transfer material P at a nip portion thereof.

Thereafter, the registration rollers 25a, 25b start rotating in timing for the image forming unit 10 stating an image formation. The timing of the registration rollers 25a, 25b start rotating is set in such a manner that the transfer material P just matches with a toner image primarily transferred on the intermediate transfer belt 31 from the image forming portion 10, at the secondary transfer area Te.

In the image forming portion 10, when the image forming operation start signal is sent from the DC controller 100, the primary transfer electrostatic charger 35 primarily transfers a toner image formed on the photosensitive member 11 onto the intermediate transfer belt 31 at the primary transfer area T.

Thereafter, when the transfer material P proceeds into the secondary transfer area Te and then contacts the intermediate transfer belt 31, a high voltage is applied to the secondary transfer roller 36 in timing for passage of the transfer material P. Then, the toner image formed on the intermediate transfer belt 31 is transferred onto the surface of the transfer material P due to the action of the secondary transfer roller 36.

These processes are performed as to a Y image first, and the transfer material P onto which the Y image has been transferred is conveyed in an opposite direction (a left-to-right direction in the drawing) to the sheet feed direction. Next, after an M image is transferred onto the intermediate transfer belt 31 in the same way, the transfer material P is conveyed in the sheet feed direction (a right-to-left direction in the drawing) with the timing matched, while the toner image formed on the intermediate transfer belt 31 is transferred onto the surface of the transfer material P. From then on, a C image and a K image are sequentially transferred onto the surface of the transfer material P in the same way. This causes the Y image, the M image, the C image, and the K image to be superposed on the transfer material P one after another, thereby realizing a full-color image on the transfer material P.

Thereafter, the transfer material P on which a full-color image is formed due to the above superposition is guided to the nip portion of a pair of the fixing rollers 41 through the conveyance guide 43. Then, the heat of a pair of the fixing rollers 41 and the pressure of the nip portion causes the toner image to be fixed on the surface of the transfer material P. Thereafter, the transfer material P is conveyed by the internal discharging rollers 44 and the external discharging rollers 45 to be discharged onto the discharging tray 48 located on the outside of the apparatus.

The image formed on the photosensitive member 11 is subjected to registration deviation due to a mechanical installation error of the photosensitive member 11, an error in a optical path length and a change in an optical path of the laser beam generated by the exposure unit 13, or the like. The registration sensor 60 is used for detecting and correcting the deviation.

The image forming apparatus described above is subjected to fluctuation of the image density of Y, M, C and K due to frequency in the use of the apparatus, the environmental conditions, or the like, thereby necessitating the correction of each of the color densities as appropriate.

Figure 2:
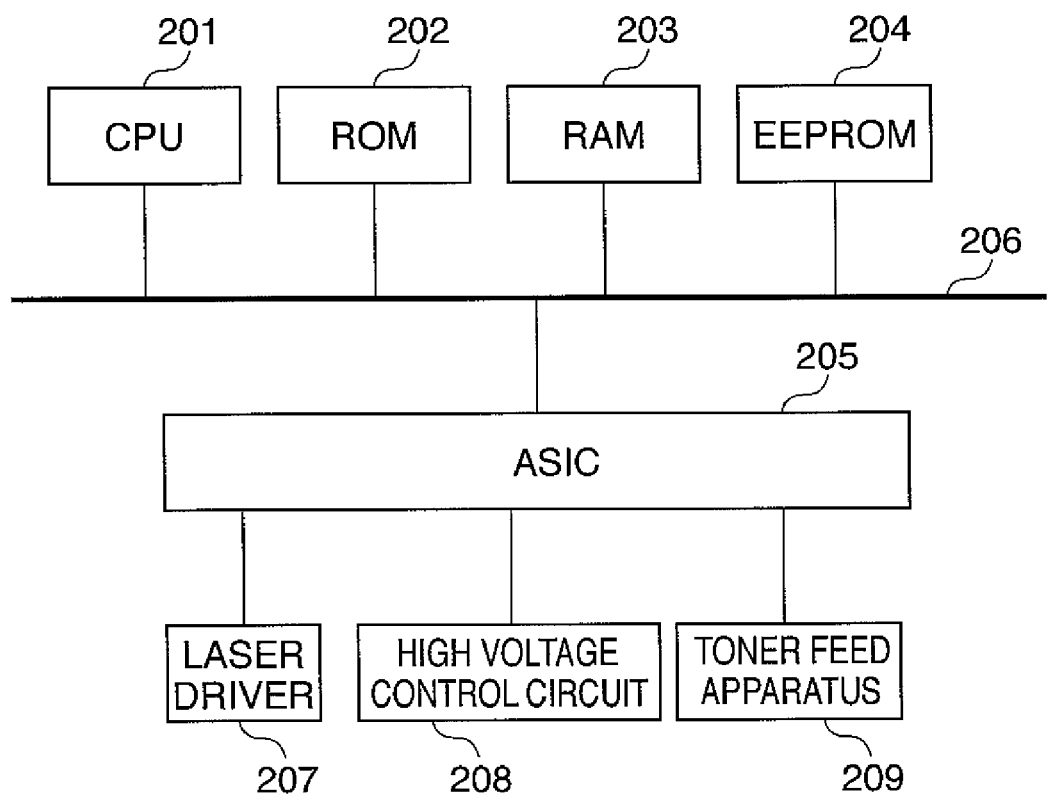
FIG. 2 is a view schematically showing an internal construction of a DC controller in FIG. 1.

FIG. 2 is a view schematically showing an internal construction of the DC controller 100 in FIG. 1.

In FIG. 2, the DC controller 100 is comprised of a CPU 201, a ROM 202, a RAM 203, an EEPROM 204, and an ASIC 205 which are connected via a system bus 206.

The CPU 201 controls the entire system, and performs a color density adjusting process of FIG. 6 described later. The RON 202 stores a series of operation programs of the CPU therein. The RAM 203 temporarily stores data used when the CPU 201 performs an operation. The EEPROM 204 can store a plurality of adjustment values of the units involved in the density adjustment and rewrite the stored values depending on the situation.

The ASIC 205 is subjected to the control to the control from the CPU 201 to control the operation of the unit involved in the density adjustment, and also has functions of reading out the adjustment values of each of the units stored in the EEPROM 204 and writing the adjustment values to a register of each of the units.

To the ASIC 205 is connected a laser driver 207, a high voltage control circuit 208, and a toner feed apparatus 209 as the units involved in the density adjustment out of the units disposed in the image forming apparatus.

The laser driver 207 controls a laser power of the exposure section 13 in FIG. 1, and has four registers in total for storing laser power values of the colors of Y, M, C and K. The high voltage control circuit 208 controls the primary electrostatic charger 12 for generating static electricity of charging the photosensitive member 11 in FIG. 1 and the primary transfer electrostatic charger 35 for generating static electricity of charging the intermediate transfer belt 31, and has eight registers in total for storing each of the charging amounts of the colors of Y, M, C and K in the electrostatic chargers. The toner feed apparatus 209 controls the development apparatuses 14Y, 14M, 14C and 14K in FIG. 1, and has four registers in total for controlling an amount of the toner supplied to the photosensitive member 11 from each of the development apparatuses 14Y, 14M, 14C and 14K.

A description will be given of adjusting procedures of performing the color density adjustment (hereinafter merely referred to as "the color adjustment" hereafter) with the above-mentioned image forming apparatus, separately divided into a normal case and a simplified case.

(Normal Color Adjustment Procedure)

Here, the image forming apparatus performs the color adjustment in the case where the number of printed copies is 500 sheets of A4 paper equivalents. The number of 500 sheets of paper is set as just an example, and the present invention is not limited thereto. This number may also be 1,000 or 2,000 sheets of paper or may be replaced with a cumulative elapsed time required for the printing.

Figure 3:
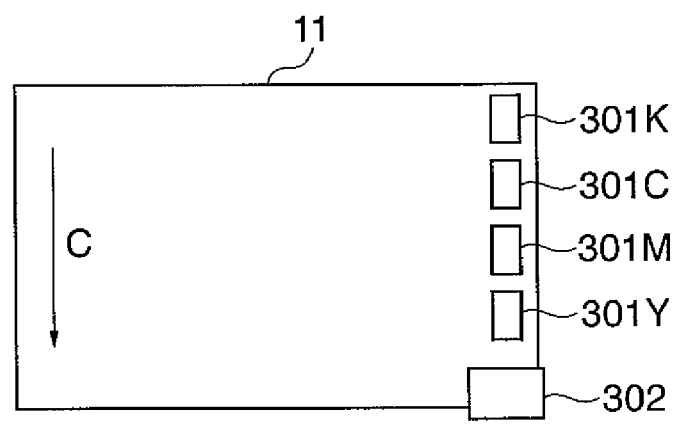
FIG. 3 is a view of a photosensitive member of FIG. 1 viewed from a direction perpendicular to a rotational axis direction of the photosensitive member.

FIG. 3 is a view of a photosensitive member of FIG. 1 viewed from a direction perpendicular to a rotational axis direction of the photosensitive member;

In FIG. 3, the rotation direction of the photosensitive member 11 is indicated by an arrow C. The color adjustment is performed by forming a visible image 301Y of Y, a visible image 301M of M, a visible image 301C of C and a visible image 301K of K on an end space area of the photosensitive member 11, as shown in FIG. 3, under a predetermined condition. Each of the formed visible images (developed images) of the respective colors has its color density (hereinafter merely referred to as "the density") which is read by a patch sensor 302.

The CPU 201 shown in FIG. 2 compares density values of the read visible images of the respective colors with respective reference values, respectively, and calculates a power of the laser element of the exposure unit 13, a voltage of the primary electrostatic charger and a supply amount of the toner so as to compensate the difference between the compared values. The calculated adjustment values are written into the respective registers of the laser driver 207, the high voltage control circuit 208, and the toner feed apparatus 209, and simultaneously stored in the EEPROM 204.

When a print job occurs thereafter, the CPU 201 reads the adjustment values from the EEPROM 204, and writes the adjustment values into the respective registers of the laser driver 207, the high voltage control circuit 208, and the toner feed apparatus 209.

As a matter of course, if no value set in each of the registers is volatilized due to, for example, power-off of the image forming apparatus during between the previous job and the present job, there is no need to read the adjustment values from the EEPROM 204 on occurrence of the job.

FIG. 4 is a view showing an example of an address map of the EEPROM in FIG. 2.

In FIG. 4, four 12-bite banks are provided bottom up from the lowest address (00h). The four banks are comprised of a bank of laser power values, a bank of primary electrostatic charger voltage values, a bank of primary transferring electrostatic charger voltage values, and a bank of toner supply amount values. Further, one of the banks is separated into three areas including an area (n) for storing the adjustment values exhibited at the time of forming the newest image, an area (n-1) for storing the adjustment values exhibited at the time of forming the previous image, and an area (n-2) for storing the adjustment values exhibited at the time of forming the further previous image, respectively.

When the adjustment described with reference to FIG. 3 is newly performed, the CPU 301 of FIG. 2 overwrites the area (n-1) with the adjustment values of the area (n), overwrites the area (n-2) with the adjustment values of the area (n-1), and then overwrites the area (n) with new adjustment values.

The writing from the EEPROM 204 to the registers belonging to the laser driver 207, the high voltage control circuit 208 and the toner feed apparatus 209 is performed by reading out the adjustment values in the area (n).

(Simplified Color Adjustment Procedure)

Next, a description will be given of a simplified color adjustment method using predicted adjustment values (hereinafter also referred to as "the predicted values").

On the condition that the color adjustment is to be performed every time the printing of 500 sheets of paper has been finished, when printing 200 sheets of paper of the present print job is performed after the printing of 400 sheets of paper has been finished before the previous print job and, the present job is interrupted once and simultaneously the above-mentioned normal color adjustment is performed at the time of the printing of 100 sheets of paper being finished, during of which normal color adjustment the user is subjected to delay of the print job termination.

The simplified color adjustment procedure of this embodiment provides a job sequence of performing the color adjustment using the predicted values before the printing of the 101-th sheet of paper is started after the printing of 100 sheets has been finished, to thereby prevent the user from coming under stress.

As for this procedure, a description will be given first of prediction of a laser power (a laser light amount) of the laser element of the exposure section 13.

Figure 5:
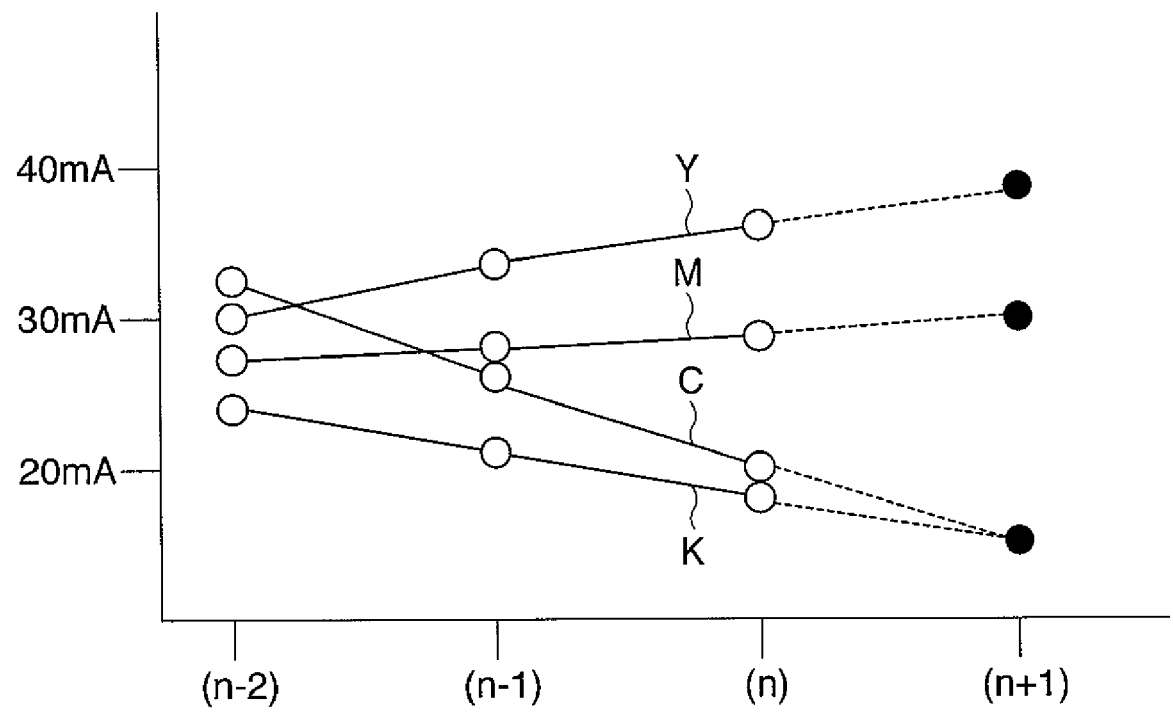
FIG. 5 is a graph of current values of a laser element of an exposure section 13 in FIG. 1, exhibited at the time of image formation in the last three times.

The EEPROM 204 stores the adjustment values used at the time of image formation in the past three times (the newest image, the previous image, and the second previous image) in the area (n-2), area (n-1) and area (n), respectively (FIG. 5). FIG. 5 is a graph of current values of the laser element of the exposure section 13 in FIG. 1, exhibited at the time of image formation in the last three times the color adjustment by the predicted values is performed by preliminarily reading out the current values of the area (n-2), the area (n-1), and the area (n) from the EEPROM 204, and then predicts the present current value with an extrapolation method applied to the read current values.

In the case of the laser power of Y in FIG. 5, for instance, the current value of the area (n-2) is 30 mA, the current value of the area (n-1) is 33 mA, and the current value of the area (n) is 36 mA; therefore, the current value of the present time is predicted to be 39 mA.

Similarly, as to the laser powers of M, C, and K, the current values are predicted to be 30 mA, 15 mA, and 15 mA, respectively. The predicted values are written into the register of the laser driver 307 and simultaneously written into the area (n) of the EEPROM 204. Simultaneously, the current value of the area (n) is shifted to the area (n-1), and the current value of the area (n-1) is shifted to the area (n-2), in sequence.

It is possible to omit a time of calculating the predicted values by performing the prediction when the color density adjustment timing (hereinafter referred to as "the adjustment timing") is determined, at the time of starting the print job, to occur during execution of the print job. When it is not sure whether or not the adjustment timing occurs, the adjustment values must be updated during the execution of the job; however, this procedure makes it to significantly reduce the copying time in comparison to the aforementioned normal color adjustment procedure The adjustment values of Y, X, C and K are also predicted as to the primary electrostatic charger voltage, the primary transfer electrostatic charger voltage, and a supply amount of the toner by using exactly the same procedure, respectively, to thereby update the adjustment values for the registers of the high voltage control circuit 208 and the toner feed apparatus 209, and the EEPROM 204.

Figure 6:
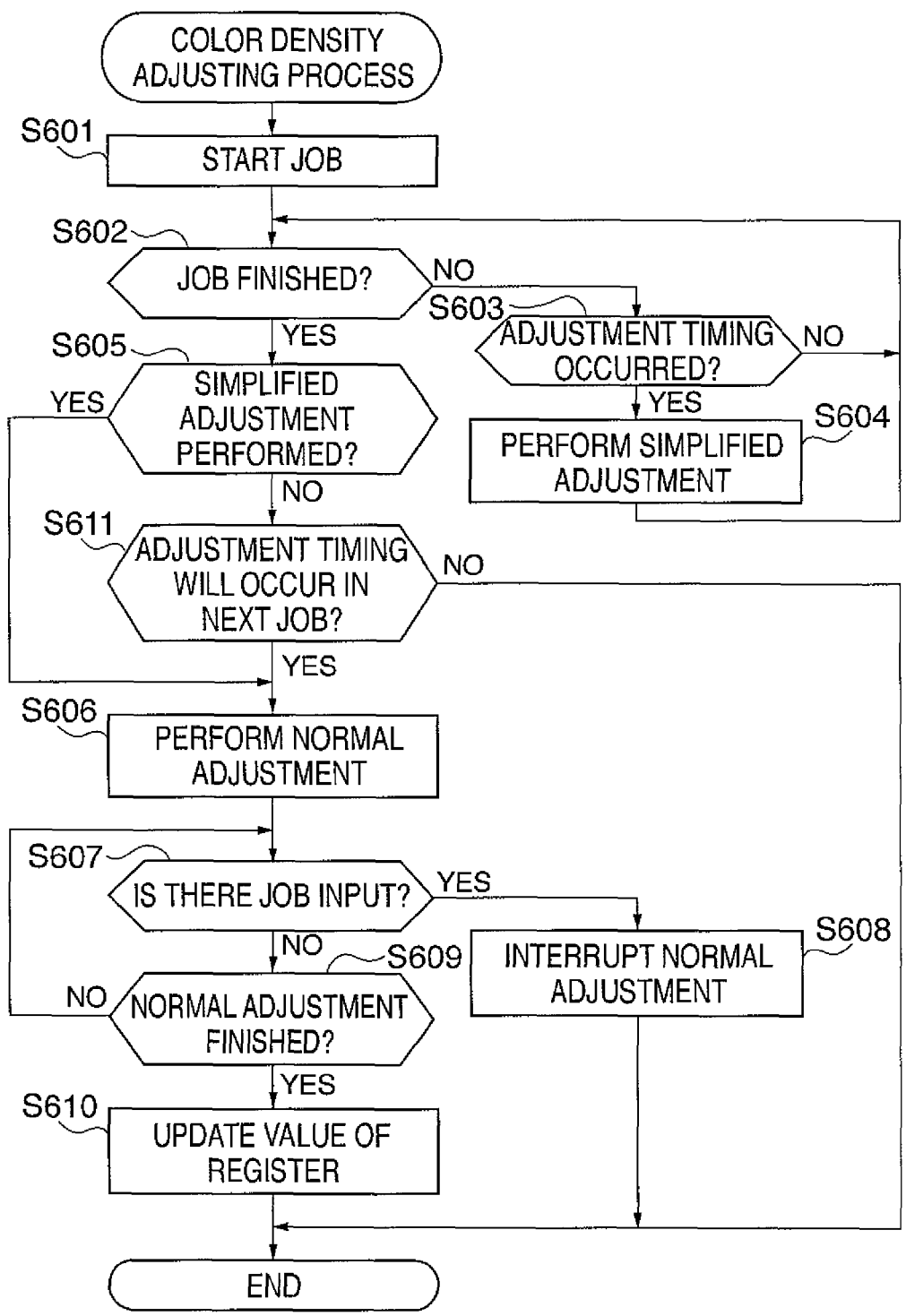
FIG. 6 is a flowchart showing the procedure of an image density adjusting process executed by a DC controller of FIG. 2.

FIG. 6 is a flowchart showing a procedure of a color density adjusting process executed by the DC controller of FIG. 2.

This process is executed by the CPU 201 in FIG. 2.

In FIG. 6, the job is started first by the user (step S601). Next, it is determined whether or not the job is finished (step S602). When the job is finished, the process proceeds to a step S605, otherwise the process proceeds to a step S603.

In the step S603, it is determined whether or not the adjustment timing has occurred. Here, when a page counter which is separately provided reaches 500, the process proceeds to a step S604, whereas the count value of the counter is less than 500, the process returns to the step S602.

When the adjustment timing has occurred in the step S603, the aforementioned simplified color adjustment (hereinafter merely referred to as "the simplified adjustment" is performed (step S604). As the job is not finished as a matter of course, the predicted value of each of adjustment items is set on each of the registers without interrupting the job. When the simplified adjustment is finished, the process returns to the step S602.

When the job is finished in the step S602, it is determined whether or not the simplified adjustment in the step S604 has been performed (step S605). When the simplified adjustment has been performed, the process proceeds to a step S606.

In the step S606, the normal color adjustment (hereinafter merely referred to as "the normal adjustment") is performed, because the job is subjected to the simplified adjustment during its execution. Next, it is determined whether or not the next job is input during execution of the normal adjustment (step S607). When the next job is input, the process proceeds to a step S608, whereas no next job is input, the process proceeds to a step S609.

The step S608 is executed when the next job is input during the execution of the normal adjustment after the job has been finished. In this step S608, the normal adjustment is interrupted, followed by terminating the process. In this case, the values of the registers and the value of the page counter are maintained unchanged.

In the step S609, it is determined whether or not the normal adjustment is finished. When not finished, the process returns to the step S607, otherwise, the process proceeds to a step S610. In the step S610, the adjustment values (values of the registers) acquired by the normal adjustment are replaced with values of the simplified adjustment acquired during the execution of the job, followed by terminating the process.

As a result of the determination of the step S605, when the simplified adjustment is not executed, the process proceeds to a step S611. In the step S611, it is determined whether or not the adjustment timing is to occur during the next job. Criteria for the determination are arbitrary; however, in this embodiment, when the value of the page counter as criteria for the determination of the adjustment timing arising is, for example, less than 50, the process proceeds to the step S606 where the normal adjustment is executed. The criteria for the determination may be flexibly changed according to the number of outputted sheets of paper per the current job. As a result of the determination of the step S611, when no adjustment timing occurs in the next job, the process is terminated.

According to the process of FIG. 6, when, during the execution of the job (NO in step S602), the adjustment timing occurs (YES in step S603), the simplified adjustment is performed (step S604). When the normal adjustment is performed (step S606) before the job is inputted (YES in step S607), the normal adjustment is interrupted (step S608). Therefore, it is possible to execute the color adjustment at optimum adjustment timing, thereby improving the printing efficiency.

The above embodiment is described on the condition that the color adjustment is to be performed every time the printing of 500 sheets of paper has been finished. As for the adjustment timing, however, the adjustment values on factory shipment are normally set as those of the area (n) in FIG. 5 while not set as those of the area (n-1) and the area (n-2) in FIG. 5, which disables the simplified adjustment to be performed up to the first $1,000^{th}$ sheet.

To avoid this problem, it is recommendable to acquire the predicted value by executing the normal adjustment after the job has been finished, up to the $1,000^{th}$ sheet after the factory shipment. The normal adjustment executed after the job has been finished causes the user to feel a restless urge if a series of jobs continue, but prevents the user's stress from being accumulated because of only during the first short period of service after installation of the apparatus.

The above embodiment also is directed to a technique of performing the simplified adjustment during the execution of the job. This technique is targeted to a preferable example of use in which the user does not care much about stability of the colors as long as red is reddish and blue is bluish in expression, as in a case where the originals are comprised of mainly text-based documents, for example.

The simplified adjustment is executed exceedingly based on the predicted values; accordingly, the above technique may not be useful for the user who frequently uses graphical originals. Such a user requires a printout which expresses desired colors even if the waiting time is long.

Therefore, when an operation panel of the image forming apparatus displays a user preference screen as shown in FIG. 6, for instance, clicking "NO" button controls the CPU 201 to prohibit the simplified adjustment.

In this case, even when the adjustment timing occurs during the execution of the job, the above-mentioned simplified adjustment is not performed but the aforementioned normal adjustment is performed with the job interrupted.

A large number of printed sheets may execute only the simplified adjustment each time. Moreover, repeated simplified adjustment possibly causes a predict value to be acquired based on the combination of the predicted values, thereby deteriorating the accuracy of the predicted values.

Therefore, when the job which has been subjected to the simplified adjustment is finished, the normal adjustment is performed. If the job occurs during the execution of the normal adjustment, then the job is started with the normal adjustment interrupted, and thereafter the normal adjustment is executed once again after the job has been finished, so as to keep the user waiting.

In the above embodiment, the adjustment is set based on the number of printed sheets or the cumulative elapsed time. However, it is known that the characteristic of the photosensitive member and the characteristic of the laser element are significantly changeable depending on the printing duty.

The adjustment timing based on the number of printed sheets may be retarded in a case where the originals are comprised of standard 8% text-based documents. The adjustment timing based on the cumulative elapsed time should be advanced in a case where the operation rate per unit time is high.

Moreover, many text-based originals are generally comprised of black characters, where the adjustment timing for K occurs earlier than those of Y, M and C.

Therefore, the printing duties of Y, M, C and K are counted, and then in a case where any one of the printing duties of Y, M, C and K reaches a predetermined count value during the execution of the job, the simplified adjustment is executed. It is possible, as a matter of course, to use the adjustment timing based on the number of printed sheets and the adjustment timing based on the cumulative elapsed time together.

It is to be understood that the object of the present invention may also be accomplished by supplying a system or an apparatus with a storage medium in which a program code of software which realizes the functions of the above described embodiment is stored, and causing a computer (or CPU or MPU) of the system or the apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-PAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from a storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed the embodiments. The scope of the following claims is to be accorded the broadest interpretation so as to encompass all such modifications and equivalent structures and functions.

This application claims the benefit of Japanese Patent Application No. 2006-110001, filed Apr. 12, 2006 which is hereby incorporated by reference herein in its entirety.

What is claimed is:

1. An image forming apparatus comprising:
a color density adjustment value-adjusting unit adapted to adjust a color density adjustment value in predetermined adjustment timing so as to keep colors of an image constant;
a color density adjustment value-storing unit adapted to store a history of the color density adjustment value in advance;
an adjustment timing occurrence-determining unit adapted to determine whether or not the adjustment timing occurs during execution of an image forming job; and
a color density adjustment value-predicting unit adapted to predict the color density adjustment value in the adjustment timing determined to occur, based on the history of the color density adjustment value stored in advance,
wherein said color density adjustment value-adjusting unit is adapted to (a) adjust the color density adjustment value based on the predicted color density adjustment value during execution of the image forming job in a situation that the adjustment timing occurrence-determining unit determines that the adjustment timing occurs during execution of the image forming job, and
(b) adjust color density adjustment value otherwise during a period of time when the image forming job is not being executed in a situation that the adjustment timing occurrence-determining unit determines that the adjustment timing does not occur during execution of the image forming job.

2. An image forming apparatus according to claim 1, wherein the color density adjustment value is comprised of a plurality of color density adjustment values including at least the color density adjustment value of previous image formation.

3. An image forming apparatus according to claim 2, wherein said color density adjustment value-predicting unit is adapted to predict the color density adjustment value with an extrapolation method.

4. An image forming apparatus according to claim 1, further comprising a selection unit is adapted to cause a user to select whether or not adjustment of the color density adjustment value is executed based on the predicted color density adjustment value.

5. An image forming apparatus according to claim 1, further comprising:
an image forming job finish-determining unit adapted to determine whether or not the image forming job has been finished; and
a color density adjustment execution-determining unit adapted to determine whether or not adjustment of the color density adjustment value is executed based on the predicted color density adjustment value when the image forming job has been finished,
wherein said color density adjustment value-adjusting unit is adapted to adjust the color density adjustment value based on a predetermined normal color density adjustment value in a case where the adjustment of the color density adjustment value is executed based on the predicted color density adjustment value.

6. An image forming apparatus according to claim 5, further comprising
an image forming job occurrence-determining unit adapted to determine whether or not an image forming job occurs during adjustment of the color density adjustment value based on the predetermined normal color density adjustment value,
a normal adjustment-interrupting unit adapted to interrupt the adjustment of the color density adjustment value based on the predetermined normal color density adjustment value when the image forming job occurs during the adjustment of the color density adjustment value based on the predetermined normal color density adjustment value; and
a color density adjustment value-updating unit adapted to, when the adjustment of the color density adjustment value based on the predetermined normal color density adjustment value has been finished with no image forming job occurring, update the color density adjustment value stored in said color density adjustment value-storing unit to the color density adjustment value acquired when the adjustment of the color density adjustment value has been finished.

7. An image forming method comprising:
a color density adjustment value-adjusting step of adjusting a color density adjustment value in predetermined adjustment timing so as to keep colors of an image constant;
a color density adjustment value-storing step of storing a history of the color density adjustment value in advance;

an adjustment timing occurrence-determining step of determining whether or not the adjustment timing occurs during execution of an image forming job; and a color density adjustment value-predicting step of predicting the color density adjustment value in the adjustment timing determined to occur, based on the history of the color density adjustment value stored in advance, wherein said color density adjustment value-adjusting step comprises (a) adjusting the color density adjustment value based on the predicted color density adjustment value during execution of the image forming job in a situation that the adjustment timing occurrence-determining step determines that the adjustment timing occurs during execution of the image forming job, and (b) adjusting the color density adjustment value otherwise during a period of time when the image forming job is not being executed in a situation that the adjustment timing occurrence-determining step determines that the adjustment timing does not occur during execution of the image forming job.

8. An image forming method according to claim 7, wherein the color density adjustment value is comprised of a plurality of color density adjustment values including at least the color density adjustment value of previous image formation.

9. An image forming method according to claim 8, wherein said color density adjustment value-predicting step comprises predicting the color density adjustment value with an extrapolation method.

10. An image forming method according to claim 6, further comprising a selection step of causing a user to select whether or not adjustment of the color density adjustment value is executed based on the predicted color density adjustment value.

11. An image forming method according to claim 7, further comprising:

an image forming job finish-determining step of determining whether or not the image forming job has been finished; and a color density adjustment execution-determining step of determining whether or not adjustment of the color density adjustment value is executed based on the predicted color density adjustment value when the image forming job has been finished, wherein said color density adjustment value-adjusting step comprises adjusting the color density adjustment value based on a predetermined normal color density adjustment value in a case where the adjustment of the color density adjustment value is executed based on the predicted color density adjustment value.

12. An image forming method according to claim 11, further comprising an image forming job occurrence-determining step of determining whether or not an image forming job occurs during adjustment of the color density adjustment value based on the predetermined normal color density adjustment value, a normal adjustment-interrupting step of interrupting the adjustment of the color density adjustment value based on the predetermined normal color density adjustment value when the image forming job occurs during the adjustment of the color density adjustment value based on the predetermined normal color density adjustment value; and a color density adjustment value-updating step of, when the adjustment of the color density adjustment value based on the predetermined normal color density adjustment value has been finished with no image forming job occurring, updating the color density adjustment value stored at said color density adjustment value-storing step to the color density adjustment value acquired when the adjustment of the color density adjustment value has been finished.

13. A computer-readable storage medium storing a program that when executed by a computer causes the computer to execute an image forming method, the program comprising:

a color density adjustment value-adjusting module of adjusting a color density adjustment value in predetermined adjustment timing so as to keep colors of an image constant;

a color density adjustment value-storing module of storing a history of the color density adjustment value in advance;

an adjustment timing occurrence-determining module of determining whether or not the adjustment timing occurs during execution of an image forming job; and a color density adjustment value-predicting module of predicting the color density adjustment value in the adjustment timing determined to occur, based on the history of the color density adjustment value stored in advance, wherein said color density adjustment value-adjusting module comprises (a) adjusting the color density adjustment value based on the predicted color density adjustment value during execution of the image forming job in a situation that the adjustment timing occurrence-determining module determines that the adjustment timing occurs during execution of the image forming job, and (b) adjusting the color density adjustment value otherwise during a period of time when the image forming job is not being executed in a situation that the adjustment timing occurrence-determining module determines that the adjustment timing does not occur during execution of the image forming job.

14. An image forming apparatus comprising:

a color density adjustment value-adjusting unit adapted to adjust color density in predetermined adjustment timing so as to keep colors of an image constant; and an adjustment timing occurrence-determining unit adapted to determine whether or not the adjustment timing occurs during execution of an image forming job, wherein said color density adjustment value-adjusting unit is adapted to adjust the color density adjustment value based on a normal color adjustment procedure when the adjustment timing occurrence-determining unit determines that the adjustment timing occurs during execution of the image forming job, wherein said color density adjustment value-adjusting unit is adapted to adjust the color density adjustment value based on a simplified color adjustment procedure during execution of the image forming job when the adjustment timing occurrence-determining unit determines that the adjustment timing does not occur during execution of the image forming job, wherein the simplified color adjustment procedure is simpler than the normal color adjustment procedure, and wherein the normal color adjustment procedure is based on a predicted color density adjustment value, which is based on a history of color density adjustment values stored in advance.

15. The image forming apparatus of claim 14, wherein the normal procedure includes forming visible images on a sheet under a predetermined condition to calculate color density adjustment values, and the simplified procedure involves using predicted color density adjustment values without forming visible images on a sheet.

* * * * *